United States Patent
Kato et al.

(10) Patent No.: US 6,212,444 B1
(45) Date of Patent: Apr. 3, 2001

(54) METHOD OF AVOIDING INTERFERENCE OF INDUSTRIAL ROBOT

(75) Inventors: Tetsuaki Kato, Hadano; Atsuo Nagayama, Oshino-mura, both of (JP)

(73) Assignee: Fanuc Limited, Yamanashi (JP)

( * ) Notice: Subject to any disclaimer, the term of this patent is extended or adjusted under 35 U.S.C. 154(b) by 0 days.

(21) Appl. No.: 09/011,740

(22) PCT Filed: Jun. 18, 1997

(86) PCT No.: PCT/JP97/02093

§ 371 Date: Feb. 18, 1998

§ 102(e) Date: Feb. 18, 1998

(87) PCT Pub. No.: WO97/49014

PCT Pub. Date: Dec. 24, 1997

(30) Foreign Application Priority Data

Jun. 18, 1996 (JP) .................................................. 8-177252

(51) Int. Cl.⁷ .................................................. G05B 19/04
(52) U.S. Cl. .......................................... 700/255; 700/245
(58) Field of Search .................................... 700/255, 245, 700/247, 253

(56) References Cited

U.S. PATENT DOCUMENTS

| | | | |
|---|---|---|---|
| 5,227,707 | * | 7/1993 | Mitomi et al. ..................... 318/568.1 |
| 5,247,608 | * | 9/1993 | Flemming et al. .................. 700/255 |
| 5,386,499 | * | 1/1995 | Tokita ................................ 700/250 |
| 5,561,742 | * | 10/1996 | Terada et al. ...................... 700/255 |
| 5,798,627 | * | 8/1998 | Gilliland et al. ................ 318/568.14 |
| 5,819,008 | * | 10/1998 | Asama et al. ..................... 700/255 |

FOREIGN PATENT DOCUMENTS

| | | |
|---|---|---|
| 6-149332 | 5/1994 | (JP) . |
| 8-141978 | 6/1996 | (JP) . |

\* cited by examiner

*Primary Examiner*—William Grant
*Assistant Examiner*—Chad Rapp
(74) *Attorney, Agent, or Firm*—Staas & Halsey LLP (57) ABSTRACT

A method of preventing interference of an industrial robot in which teaching of an operation program to the robot is easy and interference of the robot with an external cooperative apparatus can be easily avoided. If a current position of a reference point on the robot for detecting interference is outside a common area (S12) and a target position of the reference point is outside the common area (S18), a motion command is outputted to drive the robot. If the target position of the reference point is within the common area, it is determined that whether or not a movable part of the cooperative apparatus is within the common area, and if the movable part is outside the common area, an operation forbidding signal for the cooperative apparatus is turned on and the motion command is outputted to make the robot move. If the movable part of the cooperative apparatus is within the common area, the motion command is withheld till the movable part of the cooperative device moves out of the common area (S4, S5). If the current position of the reference point is within the common area (S12), the operation of the cooperative apparatus is forbidden (S15, S17).

14 Claims, 7 Drawing Sheets

METHOD OF AVOIDING INTERFERENCE OF INDUSTRIAL ROBOT

FIELD OF THE INVENTION

The present invention relates to a method of avoiding an interference between an industrial robot and a cooperative apparatus which includes another industrial robot, in performing an operation using the industrial robot.

BACKGROUND OF THE INVENTION

When an industrial robot and another apparatus cooperatively perform an operation, there is a case where an operation area of the industrial robot overlaps an operation area of the cooperative apparatus, i.e., the robot and the cooperative apparatus share the same operation area. In such a case, it is necessary to prevent the industrial robot and the cooperative apparatus from interfering with each other. According to a conventional method of preventing such interference, when a taught program for an industrial robot contains a command for moving the robot into an interference area, input/output signals are checked and if there is a possibility of interfering with another apparatus, the robot is kept waiting, and then allowed to resume the operation after it is confirmed that there is not any fear of interference by input/output signals.

It is also necessary to ensure that the cooperative apparatus does not interfere with the industrial robot when the cooperative apparatus performs its operation. Therefore, an operation command has to be outputted to the cooperative apparatus after moving the industrial robot to an area in which there is no fear of interference. Further, since the operation command for the cooperative apparatus and an operation command for the robot can not be issued simultaneously, the robot is taught to output the operation command to the cooperative apparatus after the robot is moved to a position where an operation command can be outputted to the cooperative apparatus, i.e., a position where there is not any fear of interference. Further, an operation command for performing the subsequent operation has to be taught to the robot. In a case where the robot is taught to perform only one movement, it is necessary to divide the movement into two parts in teaching, in order to output a signal for operating the cooperative apparatus, and it is also necessary to define a waiting point in the teaching to the robot. For example, the teaching of the operation program to the robot is as follows:

(1) movement to a waiting point (2) waiting until an operation permitting signal (indicating that an external apparatus has gone out of the interference area, so that there is no possibility of interference if the robot performs its operation) from the cooperative apparatus is received (3) outputting an operation forbidding signal to the external apparatus when the operation permitting signal is detected (4) performing the operation in the interference area such as mounting or picking-out of a workpiece (5) movement to the waiting point (6) turning off the operation forbidding signal for the external apparatus In the case where the operation is taught to the robot by defining the waiting point in the manner as described above, a cycle time becomes longer and an operation effectivity becomes lower since the movement, which could be achieved by one operation command if the interference is not taken into consideration, is divided into a movement to the waiting point and a subsequent movement and since the robot is taught to output the signal at the waiting point. As timing of an output of the signal to the cooperative apparatus and the operation of the robot are related with each other, if the output timing of the signal is finely adjusted, it is necessary to modify positional designation in the operation command to the robot, to make it difficult to teach an optimal operation. Furthermore, commands of input/output signals are indispensable when the robot enters or goes out of the common area (the area where there is a possibility of interference). If those commands are incorrect, it is very serious since the robot and the cooperative apparatus may interfere with each other. Thus, the teaching of the operation has to be performed circumspectly, and preparation of the operation program to the robot is difficult.

SUMMARY OF THE INVENTION

An object of the present invention is to provide a method of avoiding interference of an industrial robot in which teaching of an operation program to the robot is easy and interference of the robot with a cooperative apparatus can be avoided.

The present invention provides a method of avoiding interference of an industrial robot with a cooperative apparatus which performs an operation cooperatively with the industrial robot. In the present invention, a common area in which the operation area of the industrial robot and the operation area of the cooperative apparatus overlap and interfere with each other is set in advance to the industrial robot and the cooperative apparatus. When a predetermined reference point on the industrial robot is within the common area, an entrance forbidding signal is outputted for forbidding a movable part of the cooperative apparatus to enter the common area. When the movable part of the cooperative apparatus is within the common area, an entrance forbidding signal is outputted for forbidding the reference point of the industrial robot to enter the common area.

When the reference point of the industrial robot is outside the common area and the entrance forbidding signal is outputted from the cooperative apparatus, the industrial robot is decelerated to stop and kept waiting at a stopped position, so that the interference of the robot with the cooperative apparatus is prevented. When the output of the entrance forbidding signal from the cooperative apparatus stops, the industrial robot is automatically allowed to resume its operation.

Particularly, when the entrance forbidding signal is outputted from the cooperative apparatus and a command for moving the reference point of the industrial robot into the common area is read, the industrial robot is decelerated to stop and kept waiting at a stopped position. Whether or not the reference point of the industrial robot is to enter into the common area can be determined based on a motion command in each distribution period. If the motion command is for moving the reference point into the common area, the output of that motion command is withheld and the robot is decelerated to stop. Alternatively, whether or not the reference point of the industrial robot is to enter into the common area can be determined based on a motion command in each block of a taught program. If the motion commands is for moving the reference point into the common area, the motion command is divided into two blocks, i.e., a motion command block for moving the reference point to a boundary position of the common area and a motion command block for moving the reference point from the boundary position to a position designated by the motion command before dividing, and the motion command block for moving the reference point to the boundary position is executed so that the robot is decelerated to stop at the boundary position. When the output of the entrance forbidding signal from the cooperative apparatus stops, the industrial robot is automatically allowed to resume the operation thereof.

DESCRIPTION OF THE PREFERRED EMBODIMENTS

An embodiment of the present invention will be explained by an example where a press machine and an industrial robot cooperatively perform a press machining.

Figures 5A, 5B:
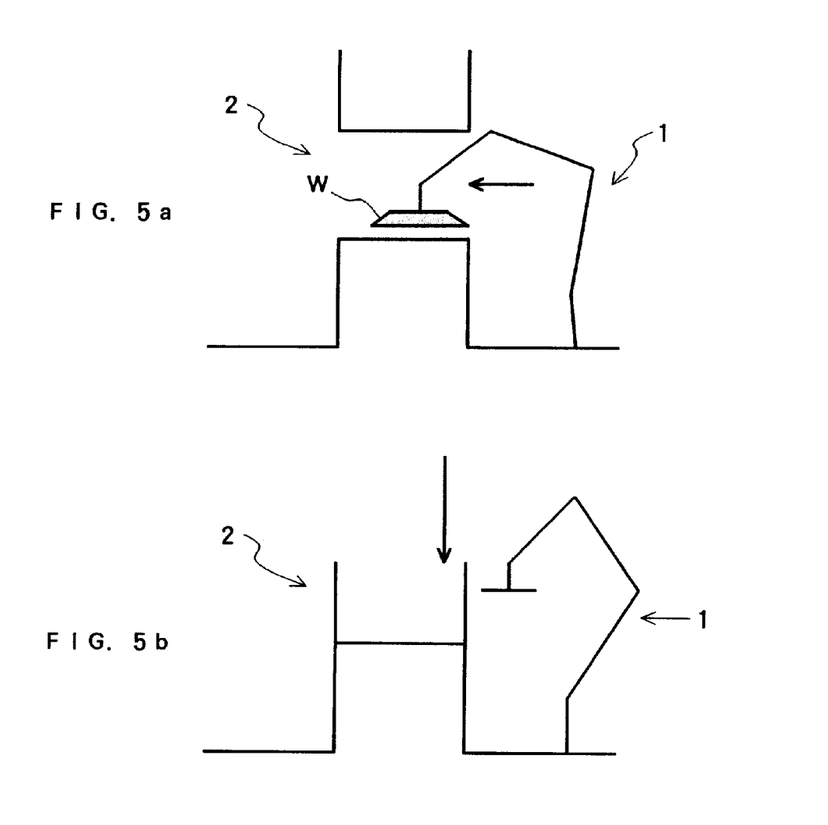
FIGS. 5a–5c are schematic diagrams showing a press operation performed by a press machine cooperatively with an industrial robot.
Figure 5C:
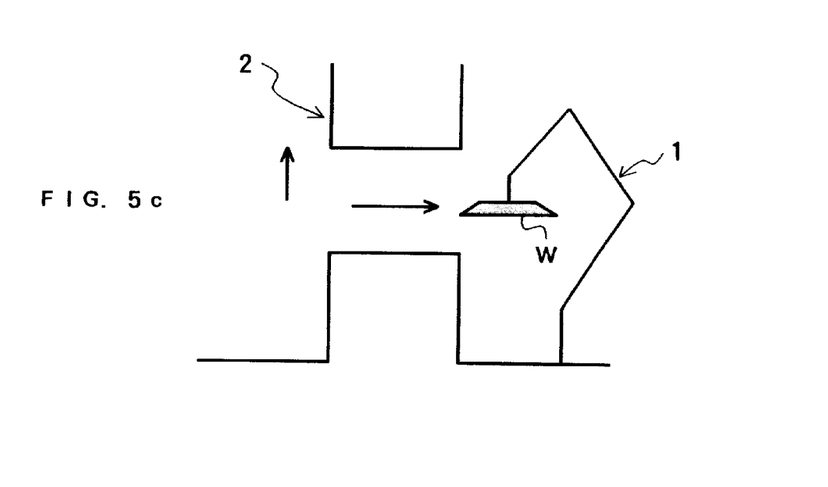

FIGS. 5a–5b are schematic diagrams of press machining performed by an industrial robot 1 and a press machine 2. FIG. 5a shows a state where an upper die, which is a movable part of the press machine 2, is raised so that a die assembly is opened. In that state, the robot 1 arranged beside the press machine 2 picks up a workpiece from a workpiece stock table or the like and carries the workpiece onto a lower die of the press machine 2. Next, as shown in FIG. 5b, after the robot 1 goes out of a working area of the press machine 2, the press machine 2 brings down the upper die to perform the press machining. Then, as shown in FIG. 5c, after the upper die of the press machine 2 is raised and the die assembly is opened, the robot 1 takes out the machined workpiece W and carries it onto a stock table or the like. The press machine 2 and the robot 1 cooperate to perform the above described press machining, repeatedly.

Figure 6:
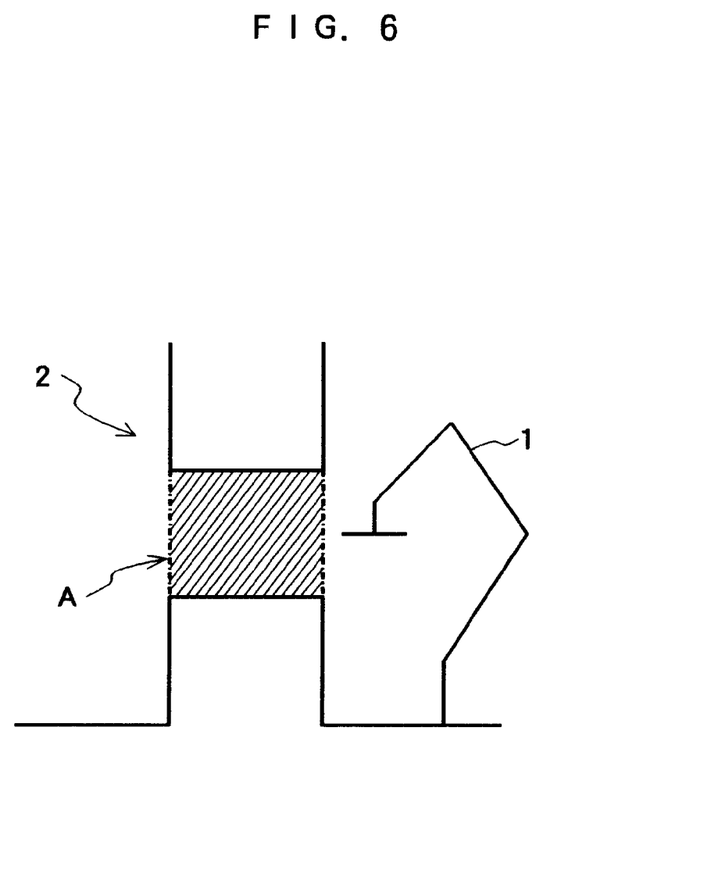
FIG. 6 is a schematic diagram showing a common area for the industrial robot and the press machine.

If the press machine 2 starts the pressing action in the state shown in FIG. 5a, the press machine 2 and the robot 1 interfere with each other, and a robot arm and the other parts may be damaged. If the robot 1 moves toward the press machine 2 in the state of FIG. 5b, they also interfere with each other. Therefore, in the present embodiment, a common area A as shown in FIG. 6 in which the press machine 2 and the robot may interfere with each other (for example, an area defined by an x-coordinate of x0 to x1, a y-coordinate of y0 to y1 and a z-coordinate of z0 to z1) is taught to the robot in advance, and when the robot 1 is in the common area A or is going into the area A, an operation forbidding signal for forbidding the operation of the press machine 2 is turned on. When the robot 1 is not in the common area A, the operation forbidding signal is turned off. Even if a press signal is on, the press machine 2 does not perform the press operation while the operation forbidding signal outputted from the robot is on, and it starts the press operation after the operation forbidding signal from the robot is turned off.

The common area is set to the press machine 2 by providing a switch at a position where the upper die, which is a movable part of the press machine 2, starts to enter the common area A. When the upper die is below the switch, an entrance forbidding signal for forbidding the robot 1 to enter the area is on, and when the upper die is above the switch, the entrance forbidding signal is off.

Normally, an operation program defining a movement path of a tip point of a tool is taught to the robot 1, and whether the robot 1 is in the area A or not can be judged by a position of the tool tip point. However, in some operation of the robot, a portion of the robot other than the tool tip may enter the area A to interfere with the press machine. Therefore, in the present embodiment, reference points are defined as being representative of portions which may interfere with the press machine, and whether the reference points are in the area A or not is determined.

Figure 7:
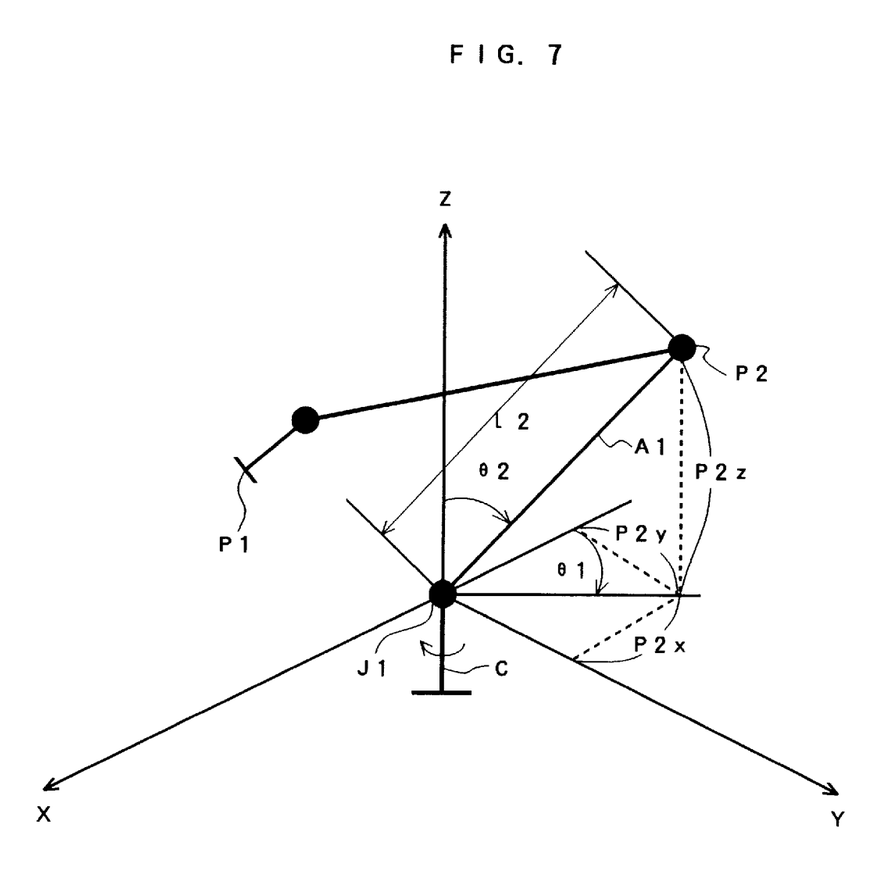
FIG. 7 is a schematic diagram showing a way of obtaining a position of a reference point for determining whether or not an industrial robot interferes with a cooperative apparatus.

The way to obtain coordinates of the reference points will be explained referring to FIG. 7. For example, a tool tip point P1 and a tip point P2 of an arm A1 driven by a joint J1 are defined as reference points. Since taught points are predetermined as positions of the tool tip point P1 in a teaching operation, the coordinates of the tool tip point P1 can be obtained by a normal processing. The coordinates of the tip point P2 of the arm A1 can be obtained in the following manner. When the arm A1 has a length of L2, a column C is turned around the z-axis by an angle $\theta1$, and the joint J1 is turned relative to the z-axis by an angle $\theta2$, the coordinates of the reference point P2 can be obtained from the length L2 of the arm A1 and the turning angles $\theta1$ and $\theta2$, as follows:

$$P2x = -L2 \cdot \sin(\theta2) \cdot \cos(\theta1)$$

$$P2y = L2 \cdot \sin(\theta2) \cdot \sin(\theta1)$$

$$P2z = L2 \cdot \cos(\theta2)$$

Thus, coordinates of an arbitrarily reference point can be obtained when a turning angle of each joint of a robot, a length between the reference point and a joint of an arm having the reference point, and respective lengths of arms from a first joint to the joint for driving the arm having the reference point are given. The length of each arm is determined, and the length from the reference point to the joint which drives the arm having the reference point can be obtained by measurement. The turning angle of each axis can be obtained when the taught program is executed. Using those determined lengths of arms, measured length from the reference point to the joint and the obtained turning angles, the coordinates of the reference point set at an arbitrary position can be obtained.

Figure 4:
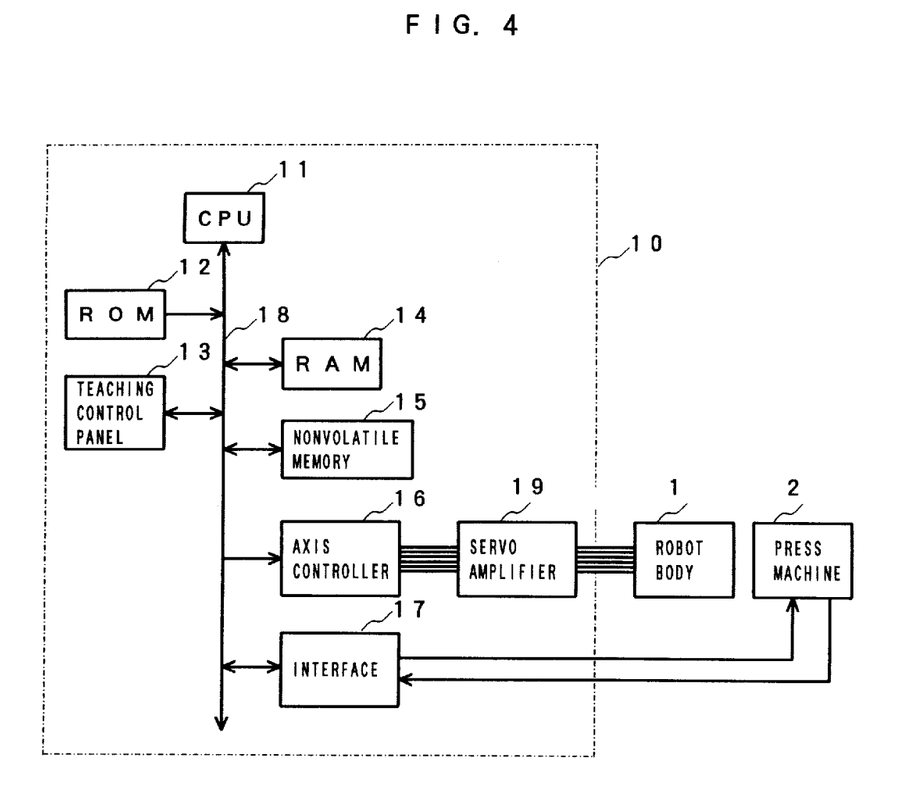
FIG. 4 is a block diagram of a robot control system for carrying out the invention.

FIG. 4 is a block diagram of a robot control system used in the present embodiment. A controller 10 for controlling a robot 1 comprises a processor 11, a ROM 12 for storing a system program, a teaching control panel 13 for teaching an operation program to the robot, a RAM 14 used in operation processing and the like, a nonvolatile memory 15 for storing the operation program, an axis control circuit 16 and an input/output interface 17, which are connected by a bus 18. The axis control circuit 16 performs a feedback control of a position and a speed, and further an electric current, based on a given motion command and a feedback signal from a position/speed detector (not shown) provided at a servomotor for driving each joint of the robot, so as to drive and control the servomotor at each joint of the robot through a servo amplifier 19 provided for each axis. The input/output interface 17 is connected to the press machine 2 as an external apparatus. Through the input/output interface 17, the operation forbidding signal for forbidding the operation of the press machine 2 is outputted (the operation of the press machine is forbidden when this signal is on), and the entrance forbidding signal is inputted from the switch which is provided at the press machine 2 for detecting a descending state of the upper die of the press machine and outputting the entrance forbidding signal.

Since the robot controller 10 has the same structure as conventional controller, a detailed explanation thereof is omitted.

The nonvolatile memory 15 stores an operation program taught through the teaching control panel 13, or an operation program inputted from an external memory device (not shown) such as a tape reader, a floppy disk driver or the like. Based on the stored operation program, the processor 11 performs processing to control the robot 1. It is not necessary to take an operating state of the press machine 2 into consideration in teaching the operation program, and it is sufficient to simply teach an operation of the robot.

Figure 1:
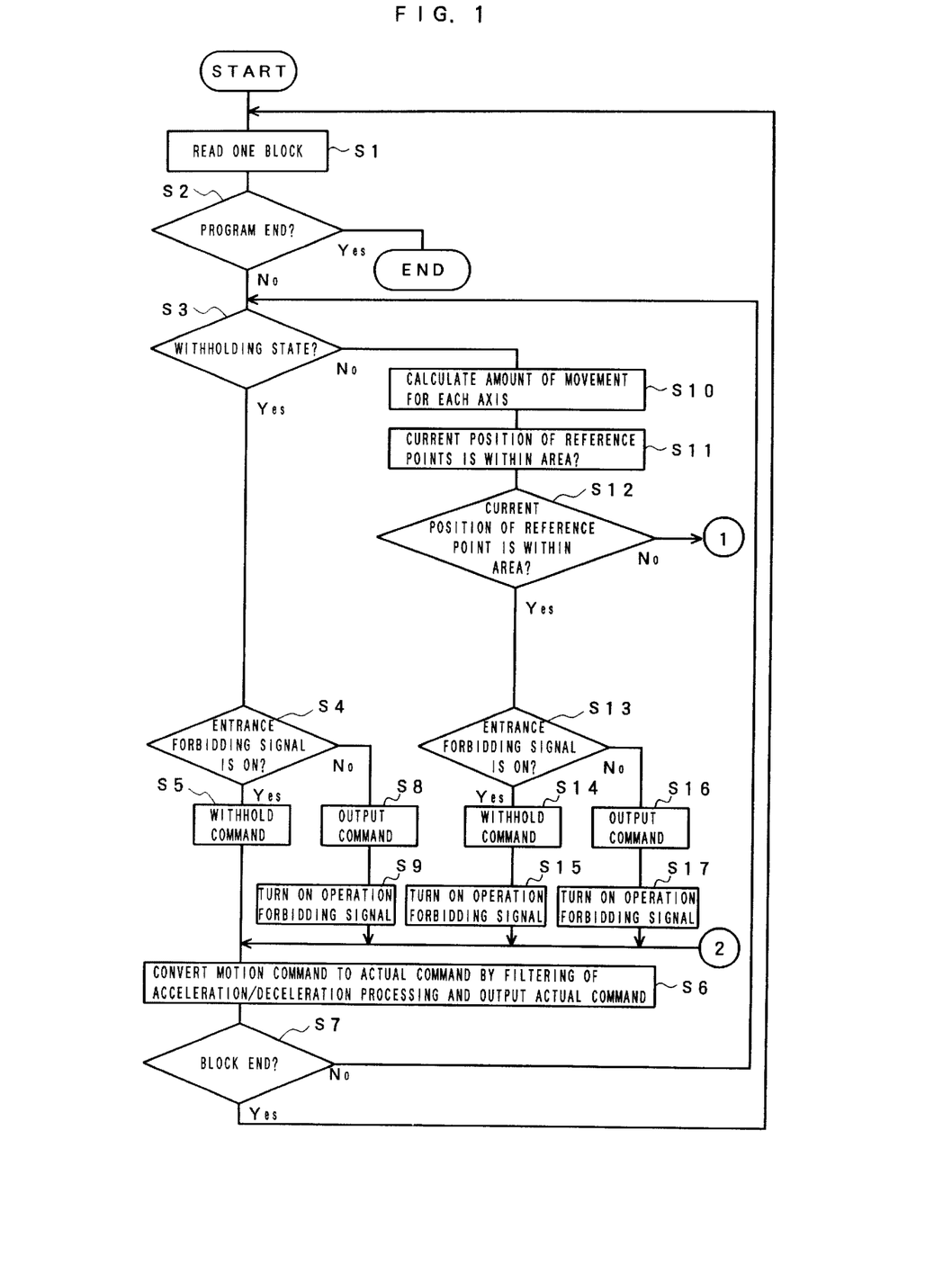
FIG. 1 is a flowchart of interference avoiding processing according to an embodiment of the present invention.
Figure 2:
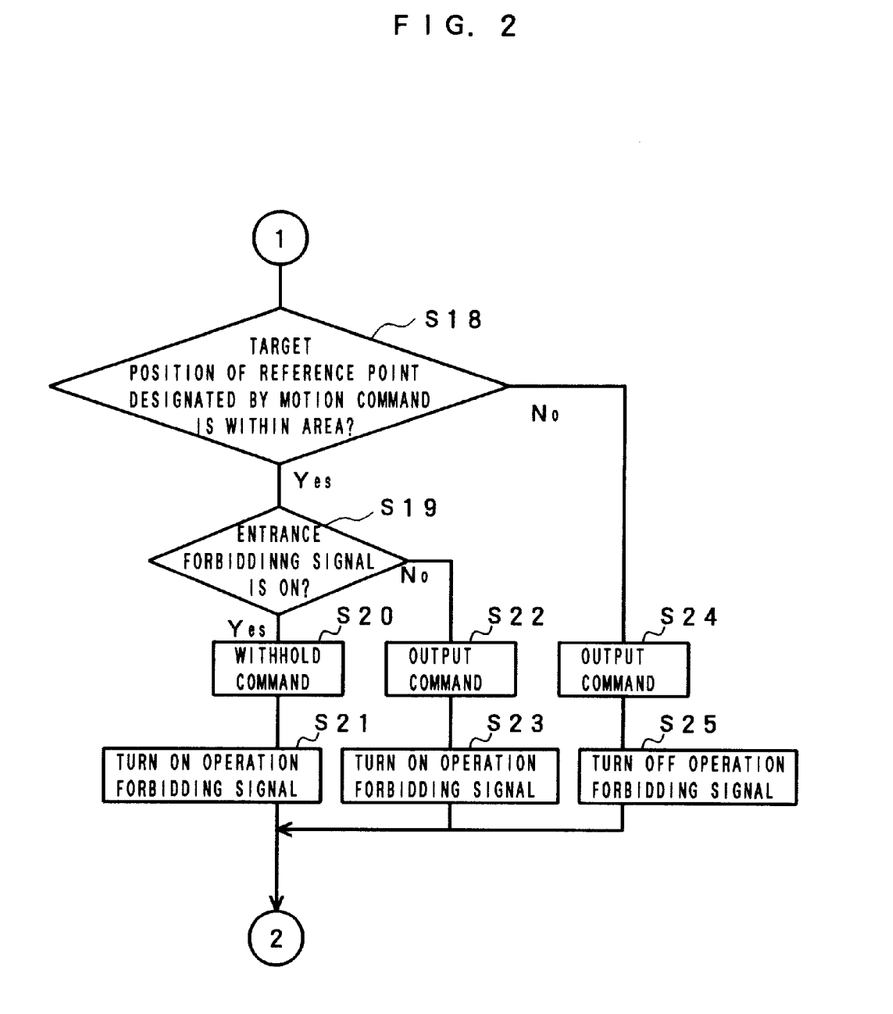
FIG. 2 is a continuation of the flowchart of FIG. 1.

FIGS. 1 and 2 are flowcharts of processing performed by the processor 11 in each distribution period of a motion command, according to the embodiment.

First, one block of the taught operation program stored in the nonvolatile memory 15 is read out (Step S1), and whether it is a program end command or not is determined (Step S2). If it is not the program end command, it is determined whether a flag indicative of a withholding state is on or not (Step S3), and if not (the flag is off in an initial state), an amount of movement for each axis in the current distribution period is calculated based on the motion command in the block read in Step S1 (Step 10), and then a target position of the reference point is calculated based on the calculated amount of movement (Step S11). Next, the current position of the reference point is obtained based on the current position of each axis, and it is determined whether the current position of the reference point is within a predetermined common area A or not (Step S12). If the current position of the reference point is not within the predetermined common area A, the processing proceeds to Step S18 (FIG. 2), and it is determined whether the target position of the reference point (i.e., the position to which the reference point is to move according to the motion command of the present period) obtained in Step S11 is within the common area A or not.

If it is determined that the target position of the reference point is not within the common area A in Step S18, the amount of movement for each shaft, which has been calculated in Step S10, is outputted (Step S24) and an operation forbidding signal for the press machine 2 is turned off to allow the press machine 2 to perform the press operation (Step S25). Then, the outputted motion command is filtered for acceleration/deceleration processing to be converted to an actual command, and then outputted to the axis control circuit 16 (Step S6) to make the robot operate by driving the servomotor for each shaft. If an end of the block read in Step S1 is not reached when the motion command has been executed (Step S7), the processing returns to Step S3, and as long as the current position and the target position of the reference point are both outside the set common area A, the above described processes of Steps S3, S10, S11, S12, S18, S24, S25, S6 and S7 are repeated. If it is determined that the end of the block is reached in Step S7, the processing returns to Step S1 to read a next block and the above described processes are repeated to drive the robot.

If it is determined in Step S18 that the target position of the reference point obtained in Step S11 is within the common area A, the processing proceeds from Step S18 to Step S19, and it is determined whether the entrance forbidding signal from the press machine 2 is on or not, i.e., whether the upper die of the press machine 2 is within the common area A or not. If the entrance forbidding signal is not on, the amount of movement for each shaft, which has been calculated in Step S10, is outputted (Step S22) in the same manner as Step S24, and the operation forbidding signal for the press machine 2 is turned on so as to forbid the press operation of the press machine 2 (Step S23). Then, the above described processes of Steps S6 and S7 are performed, and the processing is returned to Step S3 or Step S1.

If it is determined in Step S19 that the entrance forbidding signal from the press machine 2 is on, i.e., the press machine 2 is performing the press operation, the amount of movement obtained in Step S10 is not outputted but remains stored in a register, and the flag indicative of the withholding state is turned on (Step S20). Further, the operation forbidding signal is turned off to allow the press machine 2 to operate (Step S21). The processing then proceeds to Step 6. Since no motion command is outputted, the amount of movement designated by the actual command, which is outputted after the acceleration/deceleration processing by the filtering, decreases, so that the robot is decelerated to stop. Next, the processing proceeds through Step S7 to Step S3. Since the flag indicative of the withholding state is on, the processing proceeds from Step S3 to Step S4, and it is determined whether the entrance forbidding signal from the press machine 21 is on or not. If the entrance forbidding signal is on, i.e., the upper die of the press machine 2 is within the common area A, the processing proceeds to Step 6 while maintaining the withholding state (Step S5). Then, the processes of Steps S3, S4, S5, S6 and S7 are repeated till the entrance forbidding signal from the press machine 2 is turned off. During that time, the robot is kept stopping outside the common area A.

While the above described processes are repeatedly performed, if the upper die of the press machine 2 moves upward to get out of the common area A so that the entrance forbidding signal is turned off, then the processing proceeds from Step S4 to Step S8 to output the withheld motion command and turn off the flag indicative of the withholding state (Step S8). Further, the operation forbidding signal for the press machine 2 is turned on so as to forbid the press operation of the press machine 2 (Step S9), and the processing proceeds to Step 6. Since the motion command is outputted, the actual command is outputted so that the robot starts to move. If it is determined in Step S7 that the end of the block is not reached, the processing returns to Step S3. Since the flag indicative of the withholding state is not on, the processing proceeds from Step S3 to Step S10 to perform the above described processes of Steps S10 and S11, and then it is determined in Step S12 whether the current position of the reference point is within the common area A or not (Step S12). In this case, as the current position of the reference point is within the common area A, the processing proceeds to Step S13 and it is determined whether the entrance forbidding signal from the press machine 2 is on or not.

Normally, the entrance forbidding signal is off (since the upper die of the press machine is at its raised position). Therefore, the amount of movement calculated in Step S10 is outputted, the operation forbidding signal for the press machine 2 is turned on to forbid the press operation of the press machine 2 (Steps S16 and S17), and the processing proceeds to Step S6. Since the motion command is outputted, an actual command is outputted by the filtering at Step S6. If the end of the block is not reached (Step S7), the processing returns to Step S3 and the processes of Steps S3, S10, S11, S12, S13, S16, S17, S6 and S7 are repeated, so that the robot moves to the target position. When the end of the block is reached, the processing returns from Step S7 to Step S1 to handle a next block.

When the reference point gets out of the common area A and it is determined in Step S12 that the current position of the reference point is not within the common area A, the processing proceeds to Step S18, to perform the processes described above.

It is to be noted that the processes of Steps S12 to S15 normally can not be performed. That is, such a state that the current position of the reference point is within the common area A and at the same time the signal inputted from the press machine 2 is on (i.e., the upper die of the press machine 2 is within the common area A) can not occur. However, if such a state should occur due to an external disturbance or the like, the motion command is withheld at Step S14, the flag indicative of the withholding state is turned on, and the operation forbidding signal for the press machine 2 is turned on (Step S15). When the operation forbidding signal is turned on, the press machine 2 stops the press operation and keeps the stopping state at that position. Thus, the interference of the robot 1 with the press machine 2 is prevented, so that the damage of hands, arms, etc. of the robot 1 is prevented.

According to the above described processing, when the current position of the set reference point of the robot is within the common area A, the operation forbidding signal for the press machine 2 which is an external apparatus is turned on (step S15, S17) so as to forbid the press operation of the press machine 2. Even though the current position of the set reference point is outside the common area A, if the target position, to which the reference point should move, is within the common area A and the signal inputted from the press machine 2 is off, the operation forbidding signal for the press machine 2 is turned on (step S23) so as to forbid the press operation. When the target position of the reference point is within the common area A and the press machine 2 has already started the press operation, so that the entrance forbidding signal from the press machine 2 is on, the motion command is withheld to stop the movement of the robot to thereby prevent the reference point from entering the common area A (Steps S20, S21). The movement of the robot is stopped till the upper die of the press machine 2 gets out of the common area A (Steps S4, S5).

When neither the current position nor the target position of the reference point is within the common area A, the robot moves freely (Step S24), and at the same time the press machine 2 can start the press operation freely (Step S25).

The press machine 2 which is an external apparatus may operate based on its sequential program. That is, when it is detected that a workpiece is mounted on the lower die from the state with no workpiece thereon (for example, when a workpiece detecting signal is changed from an off-state to an on-state), the press machine 2 may start one cycle of its sequential program. Even though the press command is issued according to the sequential program, if the operation forbidding signal from the robot is on (Steps S15, S17 and S23), the press machine 2 does not starts the press operation. If the press machine has already started the press operation and the upper die has entered the common area A, the operation of the robot is stopped to prevent the robot from entering the common area A (Steps S20, S21 and S5). Thus, the interference between the robot 1 and the press machine 2 can be prevented. In teaching the operation program to the robot 1, it is not necessary to consider the state of the press machine 2, and thus the teaching of the operation program can be performed easily.

Figure 3:
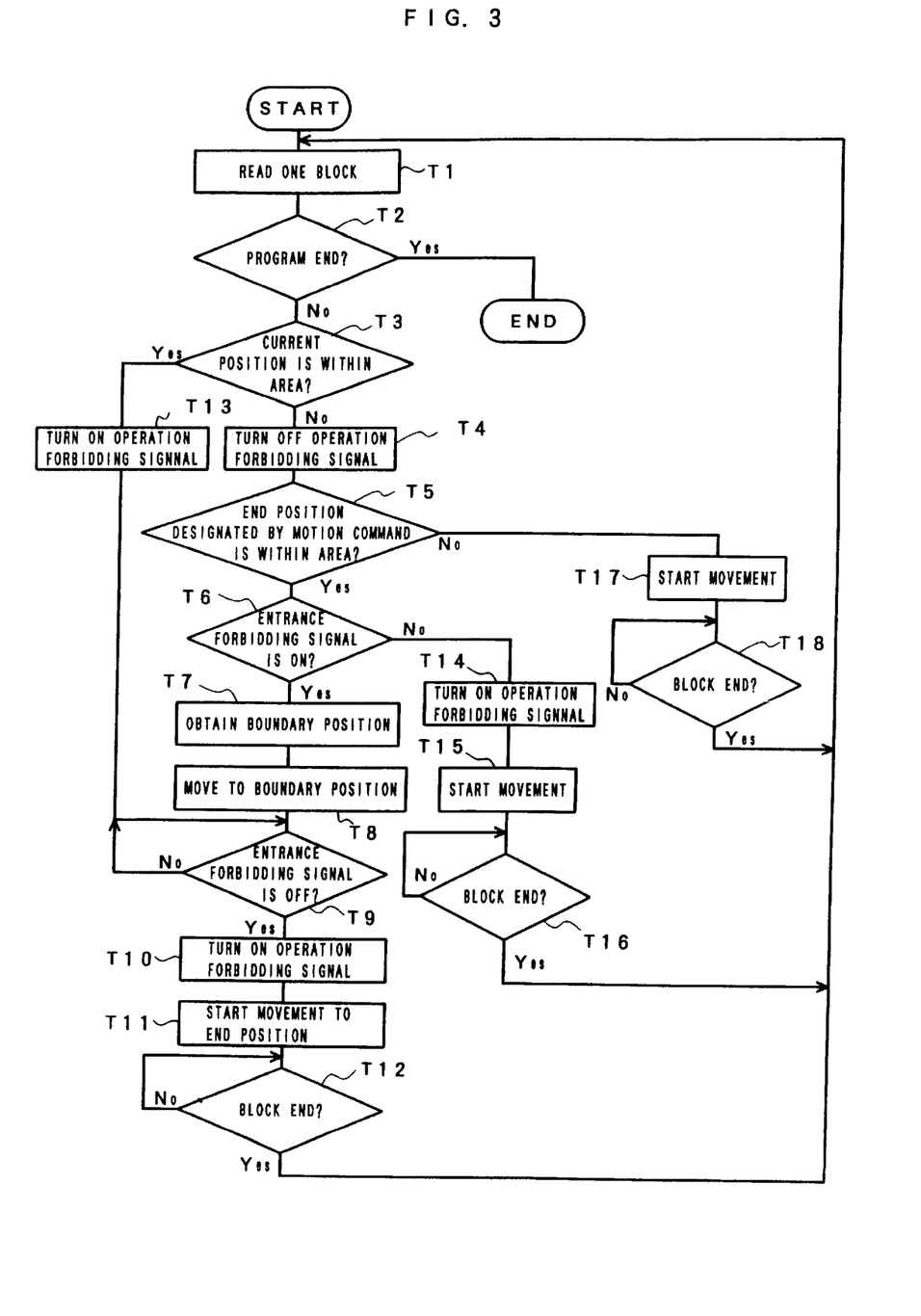
FIG. 3 is a flowchart of interference avoiding processing according to another embodiment of the present invention.

FIG. 3 is a flowchart of processing to be performed by the processor of the control device 10 of the robot 1, according to another embodiment of the present invention. The structure of the robot, the controller and the use of the press machine 2 as an external apparatus are common to the above described first embodiment. This embodiment differs from the first embodiment only in that the processing shown by the flowchart of FIG. 3 is performed in place of the processing shown by the flowcharts of FIGS. 1 and 2.

In this second embodiment, a tip of the tool serves as a reference point, and in the case where the tool tip moves from the outside to the inside of the common area A by one block of the motion command of the taught operation program, the block is automatically divided into a block of the motion command for movement to a boundary line of the common area A and a block of the motion command for movement from the boundary line to the position commanded by the program, to thereby prevent the interference. In the flowchart of FIG. 3, only a position of the tool tip point which is an object of control by the taught operation program is designated as a reference point for judging the interference.

One block is read from a taught operation program stored in a nonvolatile memory 15 (Step T1). If the read block is a program end command, the operation is terminated. If it is not the program end command (Step T2), it is determined whether the current position of the reference point is within a set common area A or not (Step T3), and if it is outside the common area A, an operation forbidding signal is turned off (Step T4). Next, it is determined whether the position designated by the read block is within the predetermined area A or not (Step T5), and if it is outside the common area A, delivering of the motion command of that block is started (Step T17). When the end of the block is reached (Step T18), the processing returns to Step T1 to read a next block and the processes of Step S2 and the following steps are performed on that block.

If it is determined in Step T5 that the designated movement position is within the common area A, the processing proceeds to Step T6 and it is determined whether an entrance forbidding signal from the press machine 2 is on or not. If it is not on, an operation forbidding signal for the press machine 2 is turned on to forbid the press operation (Step T14) and moves the robot till the end of the block is reached (Steps T15 and T16). Then, the processing is returned to Step T1. If it is determined in Step T6 that the entrance forbidding signal is on, a position of the boundary of the common area A on the movement path according to the motion command of the read block is obtained, and motion command for movement to the obtained boundary position are outputted (Steps T7 and T8). Since no further motion command is outputted subsequently, the robot is smoothly decelerated to stop at the boundary position by the acceleration/deceleration processing. The robot keeps waiting at the boundary position till the entrance forbidding signal from the press machine 2 is turned off (Step T9). When the entrance forbidding signal is turned off, the operation forbidding signal is turned on (Step T10), and the motion command for movement from the boundary position to the position designated by the block read in Step T1 are outputted (Step T11). When the end of the block is reached (Step T12), the processing is returned to Step T1 to perform the processes of Step T1 and the following steps.

If it is determined in Step T3 that the current position is within the common area A, the operation forbidding signal is turned on so as to forbid the press operation of the press machine 2 (Step T13). Then, the processing proceeds to Step T9, and it is determined whether the entrance forbidding signal is on or not. In this case, the signal is normally off, so that the above described processes of Step T10 and the following steps are performed to move the robot according to the command of the program. If it is determined in Step T3 that the current position is within the common area A to turn on the operation forbidding signal (Step T13), and then if it is determined in Step T9 that the entrance forbidding signal is on, this means that both the robot and the press machine are within the common area, which can not happen normally. However, even if such state should happen due to an external disturbance or the like, the press machine 2, which is an external apparatus, is forbidden to operate and stops since the operation forbidding signal is turned on at Step T13, while the robot also stops since it does not move till the entrance forbidding signal is turned off. Thus, the interference between the robot and the press machine can be avoided.

As described above, when the read block designates a movement that the tool tip of the robot goes into the common area A and if the entrance forbidding signal from the press machine 2 is on, i.e., the upper die of the press machine is lowered, the block is divided into a block for the movement to the boundary position of the common area A and a block for the movement from the boundary position to the end position designated by the read block. The robot moves first to the boundary position and decelerates to stop at that position to keep waiting. When the entrance forbidding signal from the press machine 2 is turned off, the robot is moved from the boundary position to the end position and the operation forbidding signal for the press machine is turned on to forbid the press operation of the press machine 2. In the case where a block of the motion command which designates a movement from the outside to the inside of the common area A is read, and the entrance forbidding signal from the press machine 2 is off, the operation forbidding signal for the press machine 2 is turned on to forbid the press operation of the press machine 2, and the robot is moved to the position designated by the read block. Then, after the robot moves out of the common area A, the operation forbidding signal is turned off, to allow the press machine 2 to perform the press operation. Thus, when the robot is within the common are A, the press operation is forbidden, and only when the robot is outside the common area A, the press operation is allowed. Therefore, the interference of the robot with the press machine can be prevented.

In the above described second embodiment of FIG. 3, only the tool tip point is selected as a reference point for avoiding the interference. If other points are selected in addition to the tool tip point, a step for calculating respective target positions of the selected reference points based on the commanded movement position obtained in Step T1 is provided immediately before Step T3, and it is determined whether the current position of each reference point is in the common area A or not in Step T3. If it is determined in Step T3 that all of the current positions of the reference points are outside the common area A, the processing proceeds to Step T4, and then in Step T5, a position of the tool tip when a reference point which has been determined to move into the common area A reaches the boundary position is obtained (if a plurality of reference points have been determined to move into the common area A, positions of the tool tip when the respective reference points reach the boundary position are obtained, and the position to which the movement amount of the tool tip is the least is chosen). Then the tool tip is moved to the obtained position through the processes of Step T5 and the following steps.

In the above first and second embodiments, the flowcharts are prepared with respect to the processing to be performed when a read block contains a motion command or a program end command. Processing to be performed when other commands (for example, a workpiece grasping command, a hand open command) are read is omitted in the flowcharts. When such a command is read, the processing for an operation required by the read command is performed and then the next block is read out.

In the present invention, when one of the industrial robot and the external apparatus is within a common area which is shared by the robot and the apparatus in their working areas, the other one is forbidden to enter the common area. Therefore, the interference between the industrial robot and the external device can be surely avoided. In addition, the teaching of the operation program to the industrial robot is made easy.

What is claimed is:

1. A method of avoiding an interference of an industrial robot with a cooperative apparatus for performing an operation cooperatively with said industrial robot, said method comprising:

setting a common area in which an operating area of said industrial robot and an operating area of said cooperative apparatus overlap and interfere with each other, to said industrial robot and said cooperative apparatus;

outputting a first entrance forbidding signal to said cooperative apparatus for forbidding a movable part of said cooperative apparatus to enter said common area when a predetermined reference point on said industrial robot is within said common area; and outputting a second entrance forbidding signal to said industrial robot for forbidding the reference point of said industrial robot to enter said common area when the movable part of said cooperative apparatus is within said common area.

2. A method of avoiding an interference of an industrial robot according to claim 1, further comprising decelerating said industrial robot to stop and keeping said industrial robot to wait at a stopped position, when the reference point of said industrial robot is outside said common area and said second entrance forbidding signal is outputted from said cooperative apparatus.

3. A method of avoiding an interference of an industrial robot according to claim 2, further comprising automatically allowing said industrial robot to resume an operation thereof, when the output of said second entrance forbidding signal from said cooperative apparatus stops.

4. A method of avoiding an interference of an industrial robot according to claim 1, further comprising decelerating said industrial robot to stop and keeping said industrial robot to wait at a stopped position, when said second entrance forbidding signal is outputted from said cooperative apparatus and a command for moving the reference point of said industrial robot into said common area is read.

5. A method of avoiding interference of an industrial robot according to claim 4, wherein said decelerating includes determining whether or not the reference point is to enter said common area based on a motion command in each distribution period; and withholding an output of said motion command and decelerating said robot to stop when said motion command is for moving said reference point to enter said common area.

6. A method of avoiding interference of an industrial robot according to claim 4, wherein said decelerating further comprises:

determining whether or not said reference point is to enter said common area based on a motion command in each block of a taught program;

dividing said motion command into a first block for moving said reference point to a boundary position of said common area and a second block for moving said reference point from said boundary position to a position designated by said motion command, when said motion command is for moving said reference point to enter said common area; and     executing the first block of said motion command and decelerating the robot to stop at an end position of said first block.

7. A method of avoiding an interference of an industrial robot according to claim 4 further comprising automatically allowing said industrial robot to resume an operation thereof, when the output of said second entrance forbidding signal from said cooperative apparatus stops.

8. A method of avoiding an interference of an industrial robot with a cooperative apparatus for performing an operation cooperatively with said industrial robot, said method comprising:

setting a common area in which an operation area of said industrial robot and an operation area of said cooperative apparatus overlap and interfere with each other, to a controller of said industrial robot and said cooperative apparatus;

outputting an operation forbidding signal for stopping an operation of a movable part of said cooperative apparatus, when a predetermined reference point on said industrial robot is within said common area;

outputting an entrance forbidding signal for forbidding the reference point in said industrial robot to enter said common area, when the movable part of said cooperative apparatus is within said common area; and     decelerating said industrial robot to stop and keeping said industrial robot to wait at a stopped position, when said entrance forbidding signal is outputted from said cooperative apparatus in said outputting and a command for moving said reference point of said industrial robot to enter said common area is read.

9. A method of avoiding interference of an industrial robot according to claim 8, wherein said decelerating further comprises determining whether or not said reference point is to enter said common area based on a motion command in each distribution period; and withholding an output of said motion command and decelerating said robot to stop when said motion command is for moving said reference point to enter said common area.

10. A method of avoiding interference of an industrial robot according to claim 8, wherein said decelerating further comprises:

determining whether or not said reference point is to enter said common area based on a motion command in each block of a taught program;

dividing said motion command into a first block for moving said reference point to a boundary position of said common area and a second block for moving said reference point from said boundary position to a position designated by said motion command, when said motion command is for moving said reference point to enter said common area; and     executing said first block of said motion command and decelerating said robot to stop at an end position of said first block.

11. A method of avoiding an interference of an industrial robot according to claim 8 further comprising automatically allowing said industrial robot to resume an operation thereof, when the output of said entrance forbidding signal from said cooperative apparatus stops.

12. An apparatus avoiding an interference of an industrial robot with a cooperative apparatus performing an operation cooperatively with said industrial robot, comprising:

a setting device setting a common area in which an operating area of said industrial robot and an operating area of said cooperative apparatus overlap and interfere with each other, to said industrial robot and said cooperative apparatus;

a first outputting device outputting a first entrance forbidding signal for forbidding a movable part of said cooperative apparatus to enter said common area when a predetermined reference point on said industrial robot is within said common area;

a second outputting device outputting a second entrance forbidding signal for forbidding the reference point of said industrial robot to enter said common area when the movable part of said cooperative apparatus is within said common area; and     a decelerating device decelerating said industrial robot to stop and keeping said industrial robot to wait at a stopped position, when the reference point of said industrial robot is outside said common area and said second entrance forbidding signal is outputted from said cooperative apparatus.

13. The apparatus recited in claim 12, further comprising a resuming device automatically allowing said industrial robot to resume an operation thereof, when the output of said second entrance forbidding signal from said cooperative apparatus stops.

14. The apparatus recited in claim 12, further comprising:

a determining device determining whether or not said reference point is to enter said common area based on a motion command in each block of a taught program;

a dividing device dividing said motion command into a first block for moving said reference point to a boundary position of said common area and a second block for moving said reference point from said boundary position to a position designated by said motion command, when said motion command is for moving said reference point to enter said common area; and     an executing device executing the first block of said motion command and decelerating the robot to stop at an end position of said first block.

\* \* \* \* \*